(12) United States Patent
Becker et al.

(10) Patent No.: US 9,056,363 B2
(45) Date of Patent: Jun. 16, 2015

(54) ANTICORROSIVE FLUX

(75) Inventors: Andreas Becker, Lachendorf (DE); Thomas Born, Holle (DE); Placido Garcia-Juan, Hannover (DE); Alfred Ottmann, Hannover (DE); Hans-Walter Swidersky, Hannover (DE)

(73) Assignee: SOLVAY FLUOR GMBH, Hannover (DE)

( * ) Notice: Subject to any disclaimer, the term of this patent is extended or adjusted under 35 U.S.C. 154(b) by 466 days.

(21) Appl. No.: 13/130,502

(22) PCT Filed: Nov. 20, 2009

(86) PCT No.: PCT/EP2009/065566
§ 371 (c)(1),
(2), (4) Date: May 20, 2011

(87) PCT Pub. No.: WO2010/060869
PCT Pub. Date: Jun. 3, 2010

(65) Prior Publication Data
US 2011/0220617 A1    Sep. 15, 2011

(30) Foreign Application Priority Data

Nov. 25, 2008 (EP) .................................. 08169856

(51) Int. Cl.
| B23K 35/02 | (2006.01) |
| B23K 1/00 | (2006.01) |
| B23K 1/008 | (2006.01) |
| B23K 1/19 | (2006.01) |
| B23K 1/20 | (2006.01) |
| B23K 35/36 | (2006.01) |

(52) U.S. Cl.
CPC ............... *B23K 1/0012* (2013.01); *B23K 1/008* (2013.01); *B23K 1/19* (2013.01); *B23K 1/203* (2013.01); *B23K 35/3605* (2013.01); *B23K 2201/14* (2013.01); *B23K 2203/10* (2013.01)

(58) Field of Classification Search
USPC ......... 219/85.2, 145.22; 148/23, 26; 428/469, 428/654
See application file for complete search history.

(56) References Cited

U.S. PATENT DOCUMENTS

| 3,951,328 A | 4/1976 | Wallace et al. |
| 3,971,501 A | 7/1976 | Cooke |
| 4,428,920 A | 1/1984 | Willenberg et al. |
| 4,475,960 A * | 10/1984 | Yamawaki et al. ............. 148/26 |
| 4,556,165 A | 12/1985 | Yamawaki et al. |
| 4,579,605 A | 4/1986 | Kawase et al. |
| 4,670,067 A | 6/1987 | Suzuki et al. |
| 4,689,092 A | 8/1987 | Suzuki et al. |
| 5,100,048 A | 3/1992 | Timsit |
| 5,100,486 A | 3/1992 | Krikorian et al. |
| 5,232,521 A | 8/1993 | Takahashi et al. |
| 5,422,191 A * | 6/1995 | Childree ........................ 428/654 |
| 5,450,666 A * | 9/1995 | Conn et al. ................ 29/890.043 |
| 5,771,962 A | 6/1998 | Van Evans et al. |
| 5,806,752 A | 9/1998 | Van Evans et al. |
| 5,980,650 A | 11/1999 | Belt et al. |
| 6,221,129 B1 | 4/2001 | Belt et al. |
| 6,234,243 B1 | 5/2001 | Murching et al. |
| 6,432,221 B1 | 8/2002 | Seseke-Koyro et al. |
| 6,733,598 B2 | 5/2004 | Swidersky et al. |
| 6,743,409 B2 | 6/2004 | Seseke-Koyro et al. |
| 6,880,746 B2 | 4/2005 | Seseke-Koyro et al. |
| 6,949,300 B2 | 9/2005 | Gillispie et al. |
| 2006/0219685 A1 * | 10/2006 | Karogal et al. ........... 219/145.22 |
| 2006/0231162 A1 | 10/2006 | Swidersky et al. |
| 2007/0277908 A1 | 12/2007 | Seseke-Koyro et al. |
| 2008/0135134 A1 | 6/2008 | Kim |
| 2009/0053547 A1 | 2/2009 | Sucke et al. |
| 2009/0165893 A1 | 7/2009 | Akazawa et al. |

FOREIGN PATENT DOCUMENTS

| CN | 101407003 A | 4/2009 |
| CN | 101439449 A | 5/2009 |
| EP | 0091231 A1 | 10/1983 |
| EP | 0347106 A1 | 12/1989 |
| EP | 1287941 A1 | 3/2003 |
| EP | 1808264 A1 | 7/2007 |
| FR | 1044447 A | 11/1953 |
| GB | 2224751 A | 5/1990 |
| JP | 61006181 A | 1/1986 |
| JP | 61099569 A | 5/1986 |
| JP | 1166900 | 6/1989 |
| JP | 1166900 | 6/1989 |
| JP | 2284766 A | 11/1990 |
| JP | 3057590 | 3/1991 |
| JP | 6198487 A | 7/1994 |
| JP | 6344179 A | 12/1994 |
| JP | 7009123 A | 1/1995 |
| JP | 8303988 A | 11/1996 |
| JP | 10193086 A | 7/1998 |
| JP | 20070175746 A | 7/2007 |
| JP | 20080168332 A | 7/2008 |
| KR | 20000047330 A | 7/2000 |
| KR | 20040098812 A | 11/2004 |
| KR | 20080089932 A | 10/2008 |
| RU | 2333082 C2 | 9/2008 |
| WO | WO 2006100054 A1 | 9/2006 |
| WO | WO 2007131993 A1 | 11/2007 |
| WO | WO 2009127707 A1 | 10/2009 |
| WO | WO 2011098120 A1 | 8/2011 |

OTHER PUBLICATIONS

Winkler, Helmut, G. F.—Die Struktur des Tief-K2Li[AlF6] und ihre Beziehung zu Elpasolith, K2Na[AlF6] und anderen Strukturen—Contributions to Mineralogy and Petrology 1952, vol. 3, No. 4, 297-306, 11 pgs; Includes abstract in English.

(Continued)

*Primary Examiner* — Brian Jennison

(57) ABSTRACT

Aluminum parts, such as heat exchangers, with improved resistance towards corrosion caused by contact with stationary water or aqueous compositions can be obtained by addition of Li compounds to the flux used for brazing such parts. LiF and especially Li fluoroaluminates are very suitable. Another aspect of the invention concerns fluxes containing Li salts and their use for brazing of aluminum parts.

21 Claims, No Drawings

(56) References Cited

OTHER PUBLICATIONS

Jeffcoate, C.—"Investigation of Interaction Between Coolant Formulations and Flux Loading/Compositions in Controlled Atmosphere Brazed (CAB) Aluminum Surfaces in Heat Exchanger Applications"—Journal of ASTM International, 2007, vol. 4, Issue 1, 9 pgs.

Takemoto T., et al—"Chemical reaction of non-corrosive flux with magnesium containing aluminium alloys and the improvement of brazeability"—Welding international, 1997, vol. 11, No. 11, pp. 845-851; 7 pgs.

Department of the Army Technical Manual TM 9-237/1: Materials Used for Brazing, Welding, Soldering, Arc Cutting, and Metallizing, published May 1960.

\* cited by examiner

ANTICORROSIVE FLUX

CROSS-REFERENCE TO RELATED APPLICATIONS

This application is a U.S. national stage entry under 35 U.S.C. §371 of International Application No. PCT/EP2009/065566 filed Nov. 20, 2009, which claims priority to European Application No. 08169856.5 filed Nov. 25, 2008, this application being herein incorporated by reference in its entirety for all purposes.

TECHNICAL FIELD OF THE INVENTION

The invention concerns a flux for brazing of aluminum, a process for brazing and brazed aluminum parts with improved anticorrosivity and the application of certain lithium compounds for improving the corrosion resistance of brazed aluminum parts.

BACKGROUND OF THE INVENTION

It is well known in the art that brazing of aluminum parts can be performed utilizing fluxes based on alkali metal fluoroaluminates. Fluxes of this type are generally considered to be noncorrosive. See for example, U.S. Pat. No. 3,971,501 which applies a flux based on $KAlF_4$ and $K_3AlF_6$, or U.S. Pat. No. 4,689,092 which applies a flux based on potassium fluoroaluminate and cesium fluoroaluminate. U.S. Pat. No. 6,949,300 discloses kinetic spraying onto metal substrates a brazing composition that comprises corrosion protector, brazing filler and/or non-corrosive flux.

If contacted for extended times with water or aqueous liquids, aluminum parts brazed with potassium fluoroaluminate based fluxes show signs of corrosion. This is disclosed by Bo Yang et al. in Journal of ASTM International, Vol. 3, Issue 10 (2006). The corrosion can be recognized by the appearance of turbidity in the water or liquid and seems, for example, to induce the formation of aluminum hydroxide. This corrosion seems to be caused by fluoride ions which are leached from brazing residues if the brazed parts are in contact with water for extended periods of time, e.g., for at least one day or longer.

SUMMARY OF THE INVENTION

Object of the present invention is to provide a flux which provides brazed aluminum parts with improved anticorrosive properties, especially after contact with water. A further object is to provide a brazing process wherein the novel flux is applied. Still another object is to provide brazed parts with improved protection against corrosion, especially when contacted with water.

It was found that the addition of lithium salts, preferably LiF and especially of fluoroaluminates the cations of which comprise Li cations or consist of Li cations, to fluxes for aluminum brazing enhances and thus improves the corrosion resistance of the brazed aluminum parts against corrosivity by water, especially stationary water. Such contact with stationary water occurs for example when brazed parts are stored in the open air.

Accordingly, one aspect of the invention concerns, the use of lithium salts, preferably of LiF and especially of fluoroaluminates containing Li cations to enhance corrosion resistance of aluminum against corrosion caused by the contact with water, especially stationary water, and aqueous compositions, e.g., cooling water, especially for vehicle motors. In other words, a process is provided for enhancing the corrosion resistance of brazed parts made of aluminum—this term, in the present invention, includes aluminum alloys—against corrosion caused by the contact with water or aqueous compositions wherein a modified flux for aluminum brazing is applied which contains Li cations. The Li cations can be contained homogenously in the flux; such a flux can be advantageously prepared by a coprecipitation method. This will be explained later. Alternatively, the Li cations can be contained in an additive. In this alternative, Li cations are contained in the additive. Preferred additives are LiF or fluoroaluminates the cations of which comprise Li cations or consist of Li cations (especially suitable are, for example, $K_2LiAlF_6$ and $Li_3AlF_6$). In the following, this flux which contains Li cations will often be termed "modified flux" while the flux which does not contain Li cations will be termed "basic flux". The contact with water or aqueous compositions preferably lasts for extended periods of time. This happens for example when the brazed parts are contacted with stationary water or cooling liquids.

DETAILED DESCRIPTION OF PREFERRED EMBODIMENTS

In principle, the modified flux can comprise any basic flux suitable for aluminum brazing. For example, an alkali metal fluorozincate basic flux, especially a potassium fluorozincate basic flux, can be used. Such basic fluxes are disclosed, for example, in U.S. Pat. Nos. 432,221 and 6,743,409. Basic fluxes based on potassium fluoroaluminate are also very suitable. Such basic fluxes are for example described in U.S. Pat. No. 3,951,328, U.S. Pat. No. 4,579,605, and U.S. Pat. No. 6,221,129. Basic fluxes containing potassium fluoroaluminate and cesium cations, e.g., in the form of potassium fluoroaluminate and cesium fluoroaluminate, as described in U.S. Pat. No. 4,670,067 and U.S. Pat. No. 4,689,062, are also very suitable. Those cesium-containing basic fluxes are especially suitable to braze aluminum-magnesium alloys. Also fluxes containing potassium fluoroaluminate and Si and optionally cesium fluoroaluminate can be used. Basic flux precursors, especially potassium hexafluorosilicate, can also be used. Preferably, the basic flux contains or consists of at least one compound selected from the group consisting of $KAlF_4$, $K_2AlF_5$, $CsAlF_4$, $Cs_2AlF_5$, $Cs_3AlF_6$, $KZnF_3$, $K_2SiF_6$, and their hydrates.

A flux comprising lithium fluoride is known from EP-A-0 091231. It is stated that the content of LiF should not fall short of 2% by weight and not exceed 7% by weight. It may be assumed that the Li+ content is present in that flux rather in the form of fluoroaluminate complexes than in free form. It is mentioned that these fluxes are very suitable to braze Al—Mg alloys. In GB-A 2 224 751, a method of treating an aluminum workpiece is described. A treatment of the workpiece with a carbon oxide, e.g., during brazing, is provided. Hereby, the workpiece blackens. The formation of a black coating is improved when LiF is present in the flux. There is no indication in these documents that the resistance of the brazed aluminum parts during contact with stationary water might be improved by brazing with fluxes containing salts which comprise Li cations and fluoride ions.

Generally, the content of $Li^+$ (this term denotes the Li cation) in the modified flux should be at least so high that the desired degree of protection against corrosion is achieved. Generally, the content of $Li^+$, when the total dry weight of the modified flux is set as 100% by weight, is equal to or greater than 0.1% by weight.

This feature will now be explained in more detail for the addition of $Li_3AlF_6$.

A content of 0.1% by weight of $Li^+$ corresponds to a content of about 1% by weight (exactly: 0.77% by weight) of $Li_3AlF_6$ in the modified flux, e.g. a potassium fluoroaluminate flux, e.g., in Nocolok a flux essentially consisting of $KAlF_4$ and $K_2AlF_5$; it contains about 20% by weight $K_2AlF_5$ and 80% by weight $KAlF_4$. Preferably, the content of $Li^+$ in the modified flux is equal to or greater than 0.13% by weight.

The content of $Li^+$ can be very high. Generally, the content of $Li^+$ in the modified flux is equal to or lower than 4.6% by weight. This corresponds to a content of about 36% by weight of $Li_3AlF_6$ in the modified flux. The remainder of 64% by weight is constituted by the basic flux. Preferably, the content of $Li^+$ is equal to or lower than 1.3% by weight. This corresponds to a content of about 10% by weight of $Li_3AlF_6$ in the flux. More preferably, the content of $Li^+$ is lower than 1.3% by weight. Most preferably, the content of $Li^+$ in the modified flux is equal to or lower than 1.16% by weight. This corresponds to a content of about 9% by weight of $Li_3AlF_6$. A range of 1 to 6% by weight of $Li_3AlF_6$ is very suitable for many fluxes. In the following table, mixtures of modified fluxes are presented for easy correlation of the content of $Li_3AlF_6$ and $Li^+$ in the modified flux. In table 1, Nocolok® constituted essentially of $KAlF_4$ and $K_2AlF_5$ was selected as basic flux; the calculation—indicating the content of the constituents in % by weight—would be the same for any other basic flux, e.g., for potassium fluorozincate, potassium fluorostannate or mixtures of potassium and cesium fluoroaluminates.

TABLE 1

Content of $Li^+$ in several mixtures containing Nocolok ® and $Li_3AlF_6$

| | Content [% bw] | | | | | |
|---|---|---|---|---|---|---|
| Nocolok ® | 64 | 75 | 82 | 85 | 90 | 91 |
| $Li_3AlF_6$ | 36 | 25 | 18 | 15 | 10 | 9 |
| $Li^+$ | 4.6 | 3.2 | 2.32 | 1.93 | 1.29 | 1.19 |
| Nocolok ® | 92 | 93 | 94 | 95 | 96 | 96.3 |
| $Li_3AlF_6$ | 8 | 7 | 6 | 5 | 4 | 3.7 |
| $Li^+$ | 1.03 | 0.9 | 0.77 | 0.6 | 0.51 | 0.48 |
| Nocolok ® | 97 | | 98 | | 99 | |
| $Li_3AlF_6$ | 3 | | 2 | | 1 | |
| $Li^+$ | 0.39 | | 0.26 | | 0.13 | |

While the following theory is not intended to be binding, it is assumed that $Li_3AlF_6$ is ideally suited because it appears to react with hexafluoroaluminate formed according to the following equations:

$$2K_2AlF_5 \rightarrow KAlF_4 + K_3AlF_6$$

$$Li_3AlF_6 + 2K_3AlF_6 \rightarrow 3K_2LiAF_6$$

Thus, it appears to be optimal if the content of $Li_3AlF_6$ is about equimolar or slightly higher, e.g., up to 20% higher, than the amount of hexafluoroaluminate to be expected after brazing. But, as described above, good results are also obtained with a differing content of $Li_3AlF_6$.

It is known in the art that alkali metal fluorides often appear in stoichiometrically different forms. For example, "potassium fluoroaluminate" exists in the form of $KAlF_4$, $K_2Al_5$ and $K_3AlF_6$. Likewise, "cesium fluoroaluminate" exists in the form of $CsAlF_4$, $Cs_2AlF_5$ and $Cs_3AlF_6$. "Potassium fluorozincate" exists as $KZnF_3$, $K_2ZnF_4$ and $K_3ZnF_5$. Even mixed compounds exist, for example, $CsAlF_4 \cdot Cs_2AlF_5$ which corresponds to the formula $Cs_3Al_2F_9$. It is also known that many of these compounds form hydrates, for example, $K_2AlF_5 \cdot H_2O$. All these compounds and any mixtures thereof are applicable as basic flux. In view of $K_3AlF_6$ it has to be stated that the content of this compound in the basic flux is preferably equal to or lower than 5% by weight, more preferably, equal to or lower than 2% by weight, and still more preferably, even less than 1% by weight including even essentially 0%.

Preferably, the basic flux is based on potassium fluoroaluminate. Very preferably, the potassium fluoroaluminate based flux contains or consists of $KAlF_4$ and $K_2Al_5$ and/or $K_2AlF_5 \cdot H_2O$. The content of $K_3AlF_6$ preferably is less than 5% by weight, and even less as described above.

The addition of Li salts, especially of $Li_3AlF_6$, to the brazing flux is very effective to provide aluminum parts with improved anticorrosive properties. In a preferred embodiment, a basic potassium fluoroaluminate flux composed essentially of $KAlF_4$ and $K_2AlF_5$ is applied, and the content of $K_2AlF_5$, $K_2AlF_5 \cdot H_2O$ or any mixtures thereof in the basic flux is equal to or greater than 10 by weight. Preferably, in one embodiment, the content of $K_2AlF_5$, $K_2AlF_5 \cdot H_2O$ or any mixtures thereof is equal to or greater than 20% by weight. More preferably, it is equal to or greater than 25% by weight. Preferably, it is equal to or lower than 40% by weight. Also in this embodiment, the content of $K_3AlF_6$ in the basic flux is preferably equal to or lower than 5% by weight, more preferably, equal to or lower than 2% by weight, and still more preferably, even less than 1% by weight including even essentially 0%.

The modified flux in this embodiment contains preferably 1 to 36% by weight of $Li_3AlF_6$, and more preferably, 5 to 35% by weight of $Li_3AlF_6$, and most preferably, 5 to less than 10% by weight, the balance to 100% is constituted by the basic flux. It was found that for basic fluxes with relatively high content of $K_2AlF_5$, $K_2AlF_5 \cdot H_2O$ or their mixtures, e.g., basic fluxes containing 30 to 40% by weight of $K_2AlF_5$, $K_2AlF_5 \cdot H_2O$ or their mixtures, a higher content of $Li_3AlF_6$—e.g., the range of 5 to less than 10% by weight—gives beneficial results.

The advantage of basic fluxes and thus, of modified fluxes, with a comparably high amount of the pentafluoroaluminate is a lower melting point. The advantage of added $Li_3AlF_6$ are the improved anticorrosive properties of the brazed parts even though the content of the pentafluoroaluminate is quite high. Some typical mixtures are given in table 2:

TABLE 2

Compositions containing $KAlF_4$, $K_2AlF_5$ and $Li_3AlF_6$

| | Content [% bw] | | | | | |
|---|---|---|---|---|---|---|
| $KAlF_4$ | 51 | 45 | 60 | 53 | 66 | 57 |
| $K_2AlF_5$ | 13 | 19 | 15 | 22 | 16 | 25 |
| $Li_3AlF_6$ | 36 | 36 | 25 | 25 | 18 | 18 |
| $Li^+$ | 4.6 | 4.6 | 3.2 | 3.2 | 2.32 | 2.32 |
| $KAlF_4$ | 51 | 53 | 54 | 54.5 | 63.5 | 55 |
| $K_2AlF_5$ | 34 | 35 | 36 | 36 | 27 | 36 |
| $Li_3AlF_6$ | 15 | 12 | 10 | 9.5 | 9.5 | 9 |
| $Li^+$ | 1.93 | 1.56 | 1.29 | 1.24 | 1.24 | 1.17 |
| $KAlF_4$ | 68 | 60 | 72 | 63 | 73 | 64 |
| $K_2AlF_5$ | 17 | 25 | 18 | 27 | 18 | 27 |
| $Li_3AlF_6$ | 15 | 15 | 10 | 10 | 9 | 9 |
| $Li^+$ | 1.93 | 1.93 | 1.29 | 1.29 | 1.17 | 1.17 |
| $KAlF_4$ | 74 | 64 | 74 | 65 | 75 | 66 |
| $K_2AlF_5$ | 18 | 28 | 19 | 28 | 19 | 28 |
| $Li_3AlF_6$ | 8 | 8 | 7 | 7 | 6 | 6 |
| $Li^+$ | 1.03 | 1.03 | 0.9 | 0.9 | 0.77 | 0.77 |
| $KAlF_4$ | 76 | 67 | 77 | 77 | 77 | 78 |
| $K_2AlF_5$ | 19 | 28 | 19 | 19.3 | 20 | 20 |
| $Li_3AlF_6$ | 5 | 5 | 4 | 3.7 | 3 | 2 |
| $Li^+$ | 0.6 | 0.6 | 0.51 | 0.48 | 0.39 | 0.26 |

In a mixture comprising about 40% by weight of $K_2AlF_5$ in the basic flux, a content of $Li_3AlF_6$ of equal to or less 10% by weight appears to be optimal.

The manufacture of potassium fluoroaluminate fluxes with varying contents of $KAlF_4$ and $K_2AlF_5$ is described in U.S. Pat. No. 4,579,605. Aluminum hydroxide, hydrofluoric acid and a potassium compound, e.g., KOH dissolved in water, are reacted. The patent discloses that by applying the starting materials in specific molar ratios and concentrations and maintaining specific reaction temperatures, the content of $KAlF_4$ and $K_2AlF_5$ in the resulting flux mixture can be predetermined.

The Li cations can be introduced into the modified flux in many ways. Often, the basic fluxes are prepared in methods including at least one precipitation step. For example, potassium fluoroaluminates can be prepared by reacting aluminum hydroxide with HF to form fluoroaluminum acid. This acid is then reacted with potassium hydroxide so that potassium fluoroaluminate precipitates. Li cations can be incorporated by applying any suitable Li salt, for example, LiF, $Li_3AlF_6$ or $K_2LiAlF_6$, or their precursors, for example, LiOH or $Li_2CO_3$ (or even Li metal) additionally to potassium hydroxide in the precipitation step or by adding a suitable salt, e.g., LiF or $Li_3AlF_6$ or $K_2LiAlF_6$ before, after or during the first step or the precipitation step. $K_2LiAlF_6$ can be obtained by melting mixtures of KF, LiF and $AlF_3$. While it is preferred to add LiF or a basic inorganic Li salt, e.g., LiOH or $Li_2CO_3$, many other organic and inorganic Li salts are considered to be suitable, for example, Li oxalate. If the expert is in doubt, simple tests can be made to find out if the modified flux fulfills the expectations.

As alternative to the wet process explained above, the modified flux can be prepared by mechanically mixing the basic flux and the Li compound in desired ratios. Also here, generally, organic and inorganic Li compounds appear suitable. Preferably, fluorine containing Li compounds, if desired in the form of mixtures of two or more such compounds, are used as source for Li cations. It is possible to apply compounds which contain only Li cations. For example, compounds or mixtures of compounds can be applied which contain Li cations and other alkali metal cations, preferably K and/or Cs cations. Thus, $K_2LiAlF_6$ can be used as source for Li cations. Often, lithium fluoroaluminate is used as source for Li cations. The term "lithium fluoroaluminate" includes $LiAlF_4$, $Li_2AlF_5$ and $Li_3AlF_6$. Details concerning these compounds are given below. It is most preferred to use LiF or $Li_3AlF_6$ as source for Li cations, especially $Li_3AlF_6$.

The modified flux is principally applicable in the same manner as the basic flux. It can be applied as such, e.g., as dry flux electrostatically or by plasma spraying. It also can be applied in a wet fluxing method. Details are given below when the aspect of the present invention concerning a brazing method is explained in detail below.

As mentioned above, the $Li^+$ modified flux improves the anticorrosive properties of parts brazed with it. It is recognized in the art that especially fluoroaluminate fluxes are basically non-corrosive towards aluminum or aluminum alloys. Nevertheless, under certain circumstances—long contact with water, especially stationary water, or aqueous liquids like cooling liquid (cooling water)—corrosion appears to occur. This can be recognized by a white precipitate (assumed to be aluminum hydroxide) which can be found in the water or aqueous liquid.

Thus, preferably, the $Li^+$ modified flux is applied to improve the resistance of aluminum parts which, after brazing, are subjected to an additional step of being in contact with water, or aqueous compositions, especially stationary water, for an extended period of time. This results often in fluoride leaching. The term "extended periods of time" denotes a period of contact which lasts at least one day, preferably at least 2 days. The term "extended period of time" has no specific upper limit. It may last for one week or longer. In the case of water containing cooling liquid, for example, the contact between the liquid and aluminum can last for years, e.g., equal to or lower than 1 year, equal to or lower than 2 years and even equal to or lower than 5 years.

In the present invention, the term "caused by fluoride ions" is used. The reason is that the greatest corrosive influence is allocated to the fluoride ion. It is considered possible that other species originating from the dissolution of the flux residue may have corrosive properties. Thus, the term "caused by fluoride ions" does not exclude the possibility that corrosion is caused by other species present in the water or aqueous solution or by other chemical mechanisms.

The term "water" includes water from natural sources, e.g., rain water, water formed as dew, and water formed after snow melt. It includes artificial water sources, e.g., tap water. The term "water" is also meant to include aqueous compositions. The term "aqueous compositions" in its broadest sense includes any composition which contains water and at least one additional component, e.g., an inorganic or organic salt, and often, liquid components, for example, an organic liquid, e.g., a monobasic or dibasic alcohol, and comes into contact with brazed aluminum parts. It includes, for example, cooling liquid which, besides water, usually additionally contains antifreeze compounds, especially glycol, and additives, for example, anticorrosives or colorants, such as those used in water coolers for stationary refrigeration equipment or stationary heat exchangers or in cooling water for vehicles.

In one preferred embodiment of this aspect of the invention, the aluminum parts which are rendered more resistant towards corrosion by applying a $Li^+$ modified flux are post-treated by a heat treatment with oxygen, or oxygen contained in air or in inert gases, e.g., in mixtures containing oxygen and argon and/or nitrogen, after brazing. It was observed that fluoride leached out of the flux residues after extended periods of time of contact of the aluminum parts with water has less corrosive impact on the brazed parts compared to brazed parts without heat treatment in air or said oxygen-containing gases.

In this embodiment, the brazed parts are subjected to a heat treatment in an oxygen containing atmosphere. Preferably, the temperature during heat treatment is equal to or higher than 400° C. Preferably, it is equal to or lower than 530° C. If desired, the temperature may be higher. A preferred oxygen containing atmosphere is air.

The duration of the heat treatment is preferably equal to or longer than 10 seconds, especially preferably equal to or longer than 30 seconds. It is preferably equal to or shorter than 1 hour, especially equal to or shorter than 15 minutes.

An oxidizing heat treatment to improve corrosion resistance is already known from EP-A-0 034706. However, it is not clear from the description of said EP application relative to which kind of corrosion or corrosion caused by what corrosive agent the treated aluminum parts might be protected. A reference to the examples indicates that the protection is intended against corrosion caused by salt water. Said EP application is not addressing problems caused by fluoride ions leached from the flux after contact with water for an extended period of time, for example, for one day or longer.

In a preferred embodiment, the terms "water" and "aqueous composition" in the frame of the present invention do not include salt water, especially salt water according to the ASTGM43 SWAT test.

According to another aspect, the invention provides a modified flux for aluminum brazing. The flux according to the present invention comprises a basic flux suitable for aluminum brazing and Li cations with the proviso that, if the basic flux is a potassium fluoroaluminate flux, the content of $K_3AlF_6$ is equal to or lower than 5% by weight, preferably equal to or lower than 2% by weight, especially preferably equal to or less than 1% by weight including 0% by weight. This content is calculated for the modified flux on a dry weight basis. Compounds containing chemically bound water (crystal water) are considered to be dry. Any additives which might be present are not included in this calculation.

In a preferred embodiment, the content of $K_3AlF_6$ is equal to or lower than 5% by weight, preferably equal to or lower than 2% by weight, especially preferably equal to or less than 1% by weight including 0% by weight in any modified flux.

Preferably, the basic flux is selected from the group consisting of $KAlF_4$, $K_2AlF_5$, $CsAlF_4$, $Cs_2AlF_5$, $Cs_3AlF_6$, $KZnF_3$, $K_2SiF_6$, their hydrates and any mixture of two, three or more thereof. Especially preferably, the basic flux is selected from the group consisting of $KAlF_4$, $K_2AlF_5$, $CsAlF_4$, $Cs_2AlF_5$, $Cs_3AlF_6$, $KZnF_3$, their hydrates and any mixture of two, three or more thereof.

The term "aluminum" includes, throughout the complete description, aluminum alloys, especially aluminum-magnesium alloys.

In principle, the modified flux according to the present invention can comprise any basic flux suitable for aluminum brazing. Such basic brazing fluxes and their preferred embodiments had already been described above. For example, an alkali metal fluorozincate basic flux can be used. Such basic fluxes are disclosed, for example, in U.S. Pat. Nos. 432,221 and 6,743,409. Basic fluxes based on potassium fluoroaluminate are also very suitable. Such basic fluxes are for example described in U.S. Pat. No. 3,951,328, U.S. Pat. No. 4,579,605, and U.S. Pat. No. 6,221,129. Basic fluxes containing potassium fluoroaluminate and cesium cations, e.g., in the form of cesium fluoroaluminate, as described in U.S. Pat. No. 4,670,067 and U.S. Pat. No. 4,689,062 are also very suitable. Those cesium-containing basic fluxes are especially suitable to braze aluminum-magnesium alloys. Basic flux precursors, especially potassium hexafluorosilicate, can also be used.

The fluxes optionally contain solder metal precursors, especially Si. The particle size of Si is preferably equal to or lower than 30 μm.

It was already mentioned above that the Li cation content can be introduced into the modified flux in two principal ways: the wet method and the dry method. In the wet method, Li cations and other alkali metal cations, especially K cations and/or Cs cations, co-precipitated. Such modified fluxes often have a rather homogenous distribution of Li cations in the modified flux. According to the dry method, dry particles of the basic flux and dry particles of the compound or compounds containing the Li cation are mechanically mixed. This method has the advantage that it can be performed very easily. The brazing results and the corrosion resistant properties of the brazed parts are very good with modified flux obtained in both ways.

It was already mentioned above that a lot of Li compounds are suitable as Li cation source to produce the modified flux. If the wet method is intended to be performed to produce the modified flux, it is preferred to apply Li compounds which react under the wet process conditions to form, at least as intermediates, lithium fluoride, Li fluoroaluminate or fluoroaluminates which contain Li cations and K and/or Cs cations. Preferred compounds are those, for example, LiOH, $Li_2CO_3$, or Li oxalate, which react with HF to form, as intermediate, LiF. It is preferred to apply LiF directly in the precipitation reaction.

If the modified flux is produced according to the dry process, it is especially preferred to apply a fluoroaluminate which contains Li cations, optionally together with other alkali metal cations. For example, $LiAlF_4$, $Li_2AlF_5$, $Li_3AlF_6$ or $K_2LiAlF_6$ can be added to the basic flux. If desired, the different powders can be mixed or milled or both to obtain a more homogenous modified flux or a modified flux with smaller particle size. A flux obtainable by mixing a potassium fluoroaluminate flux or a potassium fluoroaluminate flux containing cesium cations as basic flux and $Li_3AlF_6$ as additive.

The preferred basic flux contains or consists essentially of potassium fluoroaluminate, with the proviso defined above.

Generally, the content of $Li^+$, when the total dry weight of the modified flux is set as 100% by weight, is equal to or greater than 0.05% by weight. Preferably, it is equal to or greater than 0.1% by weight. This corresponds to a content of about 1% by weight of $Li_3AlF_6$ in the modified flux, e.g., a potassium fluoroaluminate flux, e.g., in Nocolok®, a flux essentially consisting of $KAlF_4$ and $K_2AlF_5$. Preferably, the content of $Li^+$ in the modified flux is equal to or greater than 0.13% by weight.

The content can be very high. The content of $Li^+$ can be very high. For example, the content of $Li^+$ can be equal to or lower than 10% by weight. Consequently, the content of the Li compound can be correspondingly high. For example, the content of $Li_3AlF_6$ in the modified flux can be equal to or lower than 80% by weight. Preferably, it is equal to or lower than about 36% by weight of $Li_3AlF_6$ in the modified flux. This corresponds to a content of equal to or lower than 4.6% by weight of $Li^+$. The remainder of 64% by weight is constituted by the basic flux. Preferably, the content of $Li^+$ in the modified flux is equal to or lower than 1.16% by weight. This corresponds to a content of about 10% by weight of $Li_3AlF_6$ in the flux. If compounds other than $Li_3AlF_6$ are to be used, the expert can easily determine the necessary amounts to reach a Li cation content in the above-mentioned ranges.

The term "potassium fluoroaluminate" in the context of this aspect and the other aspects of the present invention, includes monopotassium tetrafluoroaluminate ($KAlF_4$) and its hydrates, dipotassium pentafluoroaluminate ($K_2AlF_5$) and its hydrates, tripotassium hexafluoroaluminate ($K_3AlF_6$) and mixtures of at least two of said compounds. Often, the term "potassium fluoroaluminate" denotes mixtures of two or more of said compounds.

The content of $K_3AlF_6$ in the potassium fluoroaluminate is generally low. Preferably, it is equal to or lower than 5% by weight relative to the total amount of potassium fluoroaluminate set to 100% by weight, ore preferably, it is equal to or lower than 1% by weight. It is desirable that the content of $K_3AlF_6$ is as low as possible, preferably 0% by weight relative to the total amount of potassium fluoroaluminate set to 100% by weight. Often, the potassium fluoroaluminate consists essentially of a mixture of $KAlF_4$ and $K_2AlF_5$ or their hydrates; "essentially" preferably denotes that no or at most 2% by weight are constituted by $K_3AlF_6$.

Accordingly, the sum of $KAlF_4$, its hydrates if present and of $K_2AlF_5$ and its hydrates if present in the potassium fluoroaluminate can be as high as 100% by weight. Often, the sum of $KAlF_4$ and $K_2AlF_5$ (and their hydrates if present) is equal to or lower than 100% by weight; often, it is equal to or higher than 95% by weight, often even equal to or higher than 98% by weight.

In one embodiment, only $KAlF_4$ or its hydrates is contained. In another embodiment, only $K_2AlF_5$ or its hydrates is contained. Often, $KAlF_4$ (if desired, partially or completely in the form of hydrates) and $K_2AlF_5$ (if desired, partially or completely in the form of hydrates) are present. The ratio between $KAlF_4$ (including any hydrate if present) and $K_2AlF_5$ (including any hydrate if present) is very flexible. It can be 1:99 to 99:1. Often, it is in the range of 1:10 to 10:1. It was already mentioned above that a basic flux comprising 10 to 40% by weight of $K_2AlF_5$, $K_2AlF_5.H_2O$ any mixtures thereof, the balance to 100% by weight being essentially $KAlF_4$ is very suitable. The content of $K_3AlF_6$ is, as mentioned above, very low, even 0% by weight. Suitable mixtures are given above in table 2. Those modified fluxes composed of basic flux and $Li_3AlF_6$ which contain the $Li_3AlF_6$ in the upper range, especially in a range from 5 to 36% by weight, are highly preferred.

The term "lithium fluoroaluminate" denotes monolithium tetrafluoroaluminate ($LiAlF_4$), dilithium pentafluoroaluminate ($Li_2AlF_5$) and trilithium hexafluoroaluminate ($K_3AlF_6$) and any hydrates. These compounds can be prepared in analogy to the respective potassium compounds from lithium compounds and the respective fluoroaluminum acid ($HAlF_4$, $H_2AlF_5$ or $H_3AlF_6$). While inorganic basic Li compounds, for example, LiOH or $Li_2CO_3$, are very suitable, other Li compounds, e.g., LiF, might be used, optionally together with the basic Li compounds mentioned above. The fluoroaluminum acids can be produced from aluminum hydroxide and HF in the respective stoichiometric amounts. $LiAlF_4$ can also be prepared by hydrolysis of $LiAlH_4$ and subsequent reaction with HF. $Li_3AlF_6$ is available from Solvay Fluor GmbH, Hannover, Germany. The term "lithium fluoroaluminate" preferably denotes $Li_3AlF_6$.

It was already mentioned above that, preferably, the content of $Li^+$ in the modified flux is equal to or greater than 0.13% by weight.

It was also mentioned above that the content of $Li_+$ can be very high. Generally, the content of $Li^+$ in the modified flux is equal to or lower than 4.6% by weight. Preferred ranges are given above. The invention will now be explained in detail in view of the preferred embodiment in which $Li_3AlF_6$ is applied as additive, preferably in the dry method to produce the flux, i.e. by mechanically mixing the basic flux and the additive.

The modified fluxes mentioned above can be used as dry powder as such, e.g., by applying it electrostatically. It is possible to apply it together with additives as will now be explained.

There are two main categories of additives: brazing additives that improve or modify the joint between the brazed parts, e.g., improve the brazing of Al—Mg alloys or improve generally the surface properties of the joint, and fluxing additives which modify or improve the way of fluxing the parts to be joined. In the forgoing calculations, any additive, e.g., binder, solvent, thickener, thixotropic agent, solder metal or solder metal precursor or other additives possibly present in flux compositions as described now, had not been taken into the calculation or consideration. Useful additives will now be explained in some detail.

In the following paragraphs, brazing additives improving or modifying the brazing are explained, for potassium fluoroaluminate being the preferred example of a basic flux.

In one embodiment, the modified flux further contains at least one magnesium compatibilizing agent selected from the group consisting of cesium fluoroaluminates, cesium fluorozincates and potassium fluorozincates. Such a flux is also suitable to braze aluminum alloys with a content of equal to or more than 0.5% by weight of magnesium. The content of the magnesium compatibilizing agent is preferably equal to or greater than 0.5% by weight of the flux, i.e. of the sum of potassium fluoroaluminate, lithium fluoroaluminate and magnesium compatibilizing agent. Preferably, it is equal to or lower than 20% by weight of the flux.

The flux may additionally be modified by metal salts of metals of the main group or sub groups of the periodic system of the elements, for example, halides, nitrates, carbonates or oxides of zirconium, niobium, lanthanum, yttrium, cerium, titanium, strontium, indium, tin, antimony, or bismuth as described in US patent application publication 2007-0277908. These additives can be contained preferably in an amount of equal to or less than 3% by weight of the total dry weight of the flux.

The flux may also comprise solder (filler) metal, e.g., Al—Si alloys, or solder metal precursors, for example, silicon, copper or germanium as described in U.S. Pat. No. 51,000,486. The solder metal procursors, if present in the flux, are contained preferably in an amount of 2 to 30% by weight of the total flux.

Another flux highly suitable for aluminum brazing contains potassium fluorozincate, the compound containing the Li cation, and optionally Si. Also here, if contained, the Si is preferably present in an amount of 2 to 30% by weight of the total flux.

If desired, fluxes with specific particle sizes can be selected for specific methods of application. For example, the particles including any brazing additives, may have the particle size distribution as disclosed in U.S. Pat. No. 6,733,598 and are especially suitable for application according to the dry method, e.g., by electrostatic power.

The particles of the flux may be of a coarser nature than the finer particles disclosed in said U.S. Pat. No. 6,733,598. Such coarser fluxes are very suitable for the application in the form of a flux composition including the flux dispersed a solvent; they can, for example, be applied by painting, printing or spraying onto the parts.

The flux, optionally including modifying metal salts or magnesium compatibilizing agents, for example, those described above, can be applied as such, without additives, as dry powder, for example, electrostatically or by applying a low temperature plasma, as described in WO 2006/100054. In this plasma process, finely divided flux powder is partially molten by a low temperature plasma beam and sprayed onto the surface of the aluminum parts to be joined.

The flux formed from the modified flux and the brazing additives mentioned above can be applied according to the dry fluxing method, just as the modified flux alone.

The modified flux, or the flux formed from the modified flux and one or more of the brazing additives mentioned above can also be applied according to the wet method in the form of a flux composition. Here, the flux composition comprises the modified flux or flux containing one or more of said brazing additives as described above and fluxing additives which serve to improve the method of applying the flux mixture to the surface of the parts to be joined and/or to improve the properties of the parts coated with the respective flux, for example, the adhesion of the flux to the parts, before brazing.

A flux composition for wet application which contains the flux described above is another embodiment of the present invention. This flux composition (and thus also the method of brazing according to the present invention where the flux composition can be applied) will now be explained in detail.

The flux composition of the present invention suitable for the wet fluxing method contains the modified flux, optionally including one or more of the brazing additives, and at least one of the fluxing additives selected from the group consisting of solvents, binders, thickeners, suspension stabilizers, antifoaming agents, surfactants and thixotropic agents.

In one preferred embodiment, the flux composition contains the flux suspended in the solvent, especially in water, water-free organic liquids or aqueous organic liquids. Preferred liquids are those that have a boiling point at ambient pressure (1 bar abs) of equal to or lower than 350° C. The term "suspended in water" does not exclude that a part of the flux composition is dissolved in the liquid; this may be the case especially when water or aqueous organic liquids are contained. Liquids that are preferred are deionized water, mono-, di- or tribasic aliphatic alcohols, especially those with 1 to 4 carbon atoms, e.g., methanol, ethanol, isopropanol, or ethylene glycol, or glycol alkyl ethers, wherein alkyl preferably denotes linear or branched aliphatic C1 to C4 alkyl. Non-limiting examples are glycol monoalkyl ethers, e.g., 2-methoxyethanol or diethylene glycol, or glycol dialkylethers, for example, dimethyl glycol (dimethoxyethane). Mixtures comprising two or more of the liquids are also suited very well. Isopropanol or mixtures containing isopropanol are especially suitable.

The composition comprising the flux suspended in a liquid may also contain further fluxing additives, for example, thickener, surfactants or thixotropic agents.

In an especially preferred embodiment the flux is present in the form of a flux composition wherein the flux is suspended in a liquid which also contains a binder. Binders improve, for example, the adhesion of the flux mixture after their application on the parts to be brazed. Thus, the wet flux method using a flux composition comprising flux, binder and water, organic liquid or aqueous organic liquid is a preferred embodiment of the brazing process of the present invention.

Suitable binders can be selected for example from the group consisting of organic polymers. Such polymers are physically drying (i.e., they form a solid coating after the liquid is removed), or they are chemically drying (they may form a solid coating e.g., under the influence of chemicals, e.g., oxygen or light which causes a cross linking of the molecules), or both. Suitable polymers include polyolefins, e.g., butyl rubbers, polyurethanes, resins, phthalates, polyacrylates, polymethacrylates, vinyl resins, epoxy resins, nitrocellulose, polyvinyl acetates or polyvinyl alcohols. Flux compositions containing water as liquid and water-soluble polymers, for example, polyurethane, or polyvinyl alcohol as binder are especially suitable because they have the advantage that, during the brazing process, water is evaporated instead of possibly flammable organic liquids.

The compositions may include other additives which improve the properties of the composition, for example, suspension stabilizers, surfactants, especially nonionic surfactants, e.g., Antarox BL 225, a mixture of linear C8 to C10 ethoxylated and propoxylated alcohols, thickeners, e.g., methyl butyl ether, thixotropic agents, e.g., gelatine or pectines, or a wax as described in EP-A 1808264.

The content of the flux (including basic flux, Li containing additive and, if present, other additives, e.g., filler metal, filler precursor, additives, e.g., metal salts, improving the brazing or surfaces properties) in the total composition (including liquid or liquids, thixotropic agents, surfactants and binders, if present) generally is equal to or greater than 0.75% by weight. Preferably, it is equal to or greater than 1% by weight. More preferably, the flux content in the composition is equal to or greater than 5% by weight, very preferably, equal to or greater than 10% by weight of the total flux composition.

Generally, the flux content in the composition is equal to or lower than 70% by weight. Preferably, it is equal to or lower than 50% by weight.

The binder, if present, is generally contained in an amount of equal to or greater than 0.1% by weight, preferably equal to or greater than 1% by weight of the total flux composition. The binder, if present, is generally contained in an amount equal to or lower than 30% by weight, preferably equal to or lower than 25% by weight of the total composition.

The thixotropic agent, if present, is generally contained in an amount of equal to or greater than 1% by weight of the total flux composition. Generally, if present, it is contained in an amount equal to or lower than 20% by weight, preferably equal to or lower than 10% by weight.

The thickener, if present, is generally contained in an amount of equal to or greater than 1% by weight, preferably equal to or greater than 5% by weight of the total flux composition. Generally, the thickener, if present, is contained in an amount equal to or lower than 15% by weight, preferably equal to or lower than 10% by weight of the total composition.

Highly suitable flux compositions for wet applications contain 10 to 70% by weight of the flux (including filler metal, filler precursor, modifying and anticorrosive agents, e.g., metal salts, improving the brazing or surfaces properties), 1 to 25% by weight binder, 0 to 15% by weight of a thickener, 0 to 10% by weight of a thixotropic agent, and 0 to 5% by weight of other additives, e.g., a surfactant or a suspension stabilizer. Preferably, the reminder to 100% by weight is water, an organic solvent or an aqueous organic solvent.

In one specific embodiment, the flux composition is free of any water or water-free or aqueous organic liquid, but contains the flux (and optionally one or more of the filler metal or precursor, modifying or anticorrosive agents which improve the brazing process or the properties of the brazed product or other additives, e.g., those described above) as described above, and a water-soluble organic polymer as a binder which is present in the form of a water soluble package for the flux. For example, polyvinyl alcohol is very suitable as water-soluble package for the flux as described in U.S. patent application publication 2006/0231162. Such packages can be handled without dust formation, and after addition of water, they form a suspension in water including a flux and the water soluble polymer as binder.

Another aspect of the present invention is the provision of a process for brazing aluminum parts comprising a step wherein a flux or a flux composition containing potassium fluoroaluminate and lithium fluoroaluminate is applied to a part of the surface (including those parts of the surface which will be joined during brazing) or the entire surface of the parts to be brazed. After fluxing, these parts are assembled and brazed, or, alternatively, the parts to be brazed are assembled, then fluxed and then brazed. Optionally, the brazed parts can be subjected to a heat treatment after brazing. The flux or flux composition is described in detail above.

The flux can be applied according to the dry fluxing method described above. The wet flux compositions can alternatively be applied to the aluminum parts according to methods known in the art. For example, they can be sprayed onto the surface thus forming coated aluminum parts; alternatively, they can be applied by immersing the aluminum parts to be coated into the flux composition; or by painting or printing the flux composition onto the aluminum parts to be brazed thus forming coated parts. It has to be kept in mind that the term "aluminum" includes aluminum alloys, especially magnesium containing alloys. The liquid-free flux composition containing flux, water-soluble binder and optionally further additives in the form of a package can be put into water before use to form an aqueous flux composition containing suspended flux mixture and dissolved binder.

Generally, the parts coated with the wet flux composition are dried (this is of course not necessary in parts coated according to the dry method unless applies fluoroaluminate hydrates and wants to remove crystal water before starting the brazing process). Drying can be performed independently from brazing; the dried flux-coated parts can then be stored until they are brazed. Alternatively, drying can be performed directly in the brazing apparatus or in a separate drying apparatus just before the brazing operation.

For brazing, the coated parts to be joined by brazing are assembled (before or after drying if coated according to a wet process) and heated to about 560° C. to about 610° C. This can be done in an inert gas atmosphere, e.g., in a nitrogen or argon atmosphere.

It was found that parts of aluminum which are brazed with the flux of the invention which contains lithium fluoroaluminate generally are very resistant to corrosion.

A further aspect of the present invention concerns aluminum parts or aluminum alloy parts, coated with a $Li^+$ containing flux of the present invention. These parts preferably are parts used to produce heat exchangers, e.g., tubes and fins.

Another aspect of the present invention concerns assembled parts of aluminum or aluminum alloys brazed using a flux or flux composition according to the present invention. These parts are, preferably, parts used in transferring heat from one medium to another medium, preferably, the parts are heat exchangers. The following examples are intended to explain the invention further without the intent to limit it.

EXAMPLES

General Procedure

Dry method: The basic flux is mixed with the $Li^+$ containing compound and any desired other additives.

Example 1

Potassium Fluorozincate as Basic Flux and Its Use 1.1. Preparation of the Flux $KZnF_3$ (available as Nocolok® Zn Flux from Solvay Fluor GmbH, Hanover, Germany) is mixed with $Li_3AlF_6$ to obtain a flux containing the Li compound in 1% and 5% by weight of $Li_3AlF_6$ corresponding to a total amount of lithium of 0.13 and 0.65%.

1.2. Use of the Flux for Brazing

The flux is mixed with water as solvent and a water soluble polyurethane as binder and sprayed onto aluminum tubes clad with a solder metal. The tubes are then dried, and tubes coated with the flux are obtained. The tubes are then assembled with aluminum fins and brazed in a known manner by heating them up to 600° C., preferably under inert gas in an oven.

Example 2

Potassium fluoroaluminate/Si Flux as Basic Flux

Potassium fluoroaluminate containing Si powder as solder metal precursor (available as Nocolok® Sil from Solvay Fluor GmbH, Hanover, Germany) is mixed with $Li_3AlF_6$ to obtain a flux containing the Li compound in 1% and 5% by weight of $Li_3AlF_6$ corresponding to a total amount of lithium of 0.13 and 0.65%.

Example 3

Cesium Containing Flux as Basic Flux

A potassium fluoroaluminate flux containing cesium fluoroaluminate, available from Solvay Fluor GmbH, Hannover, Germany under Nocolok® Cs flux, with an atomic ratio of K:Cs=98:2, was mixed with $Li_3AlF_6$ to obtain a flux containing the Li compound in 1% and 5% by weight of $Li_3AlF_6$ corresponding to a total amount of lithium of 0.13 and 0.65%.

Example 4

Wet Process for Preparing the Li Containing Flux

A flux is prepared similar to the process described by U.S. Pat. No. 4,428,920 (Willenberg) in example 2.

An aqueous solution containing 9% by weight of KOH and 1% by weight of LiOH is prepared by mixing appropriate amounts of KOH, LiOH and desalinated water.

A tetrafluoroaluminum acid, obtainable by the reaction between alumina trihydrate and HF in a molar ratio of F/Al of 4.0, is reacted with the KOH/LiOH lye so that the molar ratio of (K+Li) to Al was 0.80. The precipitating K/Li fluoroaluminate is separated from the liquid and dried.

Example 5

Potassium Fluoroaluminate Based Flux and Their Use for Brazing

Potassium fluoroaluminate flux (Nocolok®, available from Solvay Fluor GmbH, Hannover, Germany) was mixed with $Li_3AlF_6$ to obtain a flux containing the Li compound in three percentages: 0%, 1% and 5% by weight of $Li_3AlF_6$ corresponding to a total amount of lithium of 0; 0.13 and 0.65%. Those fluxes were compared in their corrosion resistance.

Heat exchanger sections with dimensions around 10 cm·10 cm consisting typically of tubes and fins were assembled. The corresponding fluxes were applied onto the sections by immersion into slurry made of dry powder and isopropanol (approx. 25% by weight). The specimens were weighed before and after flux loading (after drying) and so, the surface being known, the flux load could be calculated. The mean value of the flux load amounts 6 g/m².

The specimens were brazed using a standard CAB (Controlled Atmosphere Brazing) brazing cycle in a technical furnace under nitrogen atmosphere. After cooling down, every part was inserted in a plastic bag and 90 g of de-ionized water were added to it. These specimens were re-opened every day and the aqueous phase observed.

In cycles of two days the aqueous phase was removed and collected in a flask. The specimens were then introduced in the plastic bags with new amounts of 90 g water for further two days. This was repeated in three cycles. The appearance of the aqueous phases was used as an indicator of metal corrosion by presence of aluminum oxide (hydroxide) which precipitates readily in form of a white suspension.

The specimens brazed with Nocolok® flux without addition of $Li_3AlF_6$ showed strong white cloudiness already after one day. The aqueous phases of the specimens brazed with Li-modified flux were all times (after 48 hours, 96 hours and 144 hours) clear and transparent and no visible traces of corrosion could be seen.

Example 6

Flux Based on Potassium Fluorozincate and Si and Its Use

Potassium fluorozincate, Si powder and $Li_3AlF_6$ are mixed in a weight ratio of 70:25:5.

6.1. Wet Application

The resulting mixture is mixed with water as solvent and a water soluble polyurethane as binder. The resulting slurry is then applied by painting onto the outer surface of aluminum tubes for heat exchangers. It has to be noted that the parts need not be clad with a solder metal or solder alloy. The coated tubes are then dried in an oven to produce tubes containing a dry coating of potassium fluorozincate, Si and $Li_3AlF_6$. The tubes can be stored until they are assembled with other aluminum parts and brazed to produce a heat exchanger. Brazing is performed in the known manner, by heating the parts to a temperature up to about 600° C., preferably under inert gas (e.g., $N_2$).

6.2. Dry Application

Potassium fluorozincate, Si powder and $Li_3AlF_6$ are mixed. aluminum parts, e.g., tubes, are coated with the dry flux by electrostatic application. In a typical apparatus, e.g., an electrostatic spray system available from Nordson, Ohio/USA, the dry powder is transported pneumatically to a spray gun in which the particles are accelerated towards the parts to be coated; at the same time, the particles are electrostatically charged.

The particle size of the flux is selected such that pneumatic transport of the powder is possible without clogging of parts of the used apparatus, but at the same time, a sufficient amount of flux particles adheres to the parts to be coated.

Preferably, the cumulated particle size of the flux lies within the curve of FIG. 10 or as indicated in table A; especially preferably, the particle size distribution lies within the curves of FIG. 11 or as indicated in table B of U.S. Pat. No. 6,733,598.

It has to be noted that also in this alternative, the aluminum parts need not be clad with a solder metal or metal alloy. The coated parts can be brazed immediately by assembling the parts and brazing them by raising the temperature up to about 600° C., preferably under inert gas.

Example 7

Flux Based on Potassium Fluoroaluminate for Dry Fluxing

A potassium fluoroaluminate flux for dry fluxing having a particle size distribution lying within the curves of FIG. 11 or as indicated in table B of U.S. Pat. No. 6,733,598; the flux is available under the tradename Nocolok Dryflux from Solvay Fluor GmbH, Germany.

7.1. Flux for Solderfree Brazing Aluminum or Aluminum Alloys

The potassium fluoroaluminate dry flux is mixed with Si powder and $Li_3AlF_6$ so that the content of Si in the total flux is about 25% by weight, and the content of $Li_3AlF_6$ is about 3% by weight. The flux is applied by an elextrostatic spray system to aluminum tubes which, after coating, are brazed in a known manner. 7.2. Flux for solderfree brazing of aluminum parts with higher Mg content The flux of example 7.1 is mixed with cesium tetrafluoroaluminate such that in the resulting flux mixture, the atomic ratio of K:Cs is about 98:2. The resulting flux is then applied to unclad tubes made from an aluminum alloy containing about 0.3% by weight of magnesium. Brazing of the coated tubes is then performed in a known manner by assembling the parts and heating them up to about 600° C.

Example 8

Flux High in $K_2AlF_5.H_2O$ 8.1. Preparation of the Basic Flux

A potassium fluoroaluminate flux is produced as described in example 19 of U.S. Pat. No. 4,579,605. Hydrofluoric acid with 40% by weight of HF, potassium lye with a content of 25% by weight of KOH and $Al(OH)_3$ were reacted in a molar ratio of raw material of Al:F:K=1:4:1.5. The $Al(OH)_3$ is added to the hydrofluoric acid and dissolved therein. Then, the potassium lye is added. The reaction mixture is kept at 60° C. The resulting basic flux composition contains 40% by weight of $K_2AlF_5.H_2O$ and 60% by weight of $KAlF_4$.

8.2. Flux Comprising 5% by Weight of $Li_3AlF_6$ 250 g of the basic flux of example 8.1 and 13.2 g of $Li_3AlF_6$ are thoroughly mixed. The resulting flux contains 38% by weight of $K_2AlF_5.H_2O$, 57% by weight of $KAlF_4$ and 5% by weight of $Li_3AlF_6$.

8.3. Flux Containing 8% by Weight of $Li_3AlF_6$ 250 g of the basic flux of example 8.1 and 21.7 g of $Li_3AlF_6$ are thoroughly mixed. The resulting flux contains 36.8% by weight of $K_2AlF_5.H_2O$, 55.2% by weight of $KAlF_4$ and 8% by weight of $Li_3AlF_6$.

Example 9

Flux High in $K_2AlF_5$ 9.1. Preparation of Dehydrated $K_2AlF_5$

A composition comprising 98.5% by weight of $K_2AlF_5.H_2O$ and 1.5% by weight of KAlF4 is produced as described in example 7 of U.S. Pat. No. 4,579,605 by dissolving $Al(OH)_3$ in hydrofluoric acid containing 20% by weight of HF and reacting the resulting fluoroaluminum acid with potassium lye with a content of 25% by weight of KOH (molar ratio of Al:F:K=1:4:1) at 30° C. The resulting raw product is dried in a drier at 570° C., residence time 0.5 seconds. The resulting product is irreversibly dehydrated $K_2AlF_5$ containing minimal amounts of $KAlF_4$.

9.2 Preparation of the Basic Flux 100 g of Nocolok® flux (available from Solvay Fluor GmbH) which comprises about 20% by weight of $K_2AlF_5$, the remainder to 100% by being $KAlF_4$, is mixed with 19 g of the dehydrated $K_2AlF_5$ of example 9.1. The resulting basic flux contains about 32.5% by weight of $K_2AlF_5$ and 67.5% by weight of $KAlF_4$.

9.3. Preparation of a Flux Comprising $K_2AlF_5$ 119 g of the basic flux of example 9.2 and 10.3 g of $Li_3AlF_6$ are thoroughly mixed. The resulting flux contains 8% by weight of $Li_3AlF_6$, about 30% by weight of $K_2AlF_5$ and 62% by weight of $KAlF_4$.

Example 10

Brazing with Fluxes High in $K_2AlF_5$ 10.1. Brazing with the Flux of Example 8.2

Heat exchanger sections with dimensions around 10 cm·10 cm consisting typically of tubes and fins are assembled. The flux of example 8.2 is applied onto the sections by immersion into slurry made of dry powder and isopropanol (approx. 25% by weight). The specimens are weighed before and after flux loading (after drying) and so, the surface being known, the flux load is calculated. The mean value of the flux load amounts 6 g/m².

The specimens are brazed using a standard CAB (Controlled Atmosphere Brazing) brazing cycle in a technical furnace under nitrogen atmosphere. The resulting brazed assembly has an improved resistance towards corrosion.

10.2. Brazing with the Flux of Example 8.3

Example 10.1 is repeated using the flux of example 8.3. Once again, the resulting brazed assemblies have an improved corrosion resistance.

10.3. Brazing with the Flux of Example 9.3

Example 10.1 is repeated using the flux of example 9.3 to obtain brazed assemblies have an improved corrosion resistance.

Example 11

Li-Containing flux with Low-Melting Basic Flux

The basic flux applied was Nocolok® LM (wherein LM stands for Low Melting). This flux is available from Solvay Fluor GmbH, Hannover, Germany. The basic flux contained around 40% $K_2AlF_5$ by weight (calculated based on the LOH of crystal water from $K_2AlF_5H_2O$)

Modified flux: 9 parts of the basic flux were mechanically mixed with 1 part of with $Li_3AlF_6$.

The amount of Li3AlF6 to completely react with K2AlF5 in Nocolok® LM is roughly 10%. Angle-on-coupon specimens (2.5×2.5 cm²) were brazed with flux loads of 8 g/m² using original Nocolok® LM and the above mentioned modified flux (blend 9:1).

One day later, the specimens were placed in 20 ml de-ionized water (soaking tests).

After 15 days immersion (recipients opened nearly daily to assure oxygen exchange). It was found that the aqueous phase of the assembly brazed with modified flux kept clear, while the other aqueous phase was slightly opaque which indicates some corrosion.

The invention claimed is:

1. A process for enhancing the corrosion resistance of brazed parts made of aluminum or aluminum alloys against corrosion caused by the contact with water or aqueous compositions, comprising
   applying a modified flux for aluminum brazing to at least a portion of a surface of the parts to be brazed which are made of aluminum or aluminum alloys, said modified flux containing a basic flux and Li cations, wherein the basic flux contains equal to or less than 5% by weight of $K_3AlF_6$;
   assembling the parts to be brazed; and
   brazing the assembled parts.

2. The process of claim 1 wherein the basic flux is selected from the group consisting of potassium fluoroaluminate fluxes; potassium fluoroaluminate and cesium fluoroaluminate containing fluxes; potassium fluorozincate containing fluxes; potassium fluoroaluminate and Si and optionally cesium fluoroaluminate containing fluxes; and potassium hexafluorosilicate containing fluxes.

3. The process of claim 1 wherein the Li cations in the modified flux are contained in an additive which is selected from the group consisting of LiF, Li fluoroaluminates, lithium potassium fluoroaluminates, and their precursors.

4. The process of claim 2 wherein the basic flux contains at least one compound selected from the group consisting of $KAlF_4$, $K_2AlF_5$, $CsAlF_4$, $Cs_2AlF_5$, $Cs_3AlF_6$, $KZnF_3$, $K_2SiF_6$, and their hydrates.

5. The process of claim 3 wherein the additive is selected from the group consisting of LiF and $Li_3AlF_6$.

6. The process of claim 1, further comprising a post-treatment step to enhance corrosion resistance of said brazed parts against corrosion caused by fluoride ions leached from flux residues during their contact with water or aqueous compositions.

7. The process of claim 6 wherein the post-treatment is a heat treatment, and wherein the process comprises subjecting the brazed parts to said heat treatment with oxygen or an oxygen-containing gas at a temperature of equal to or higher than 400° C. and equal to or lower than 530° C.

8. The process of claim 7 wherein the heat treatment is performed for a duration equal to or longer than 30 seconds, and equal to or shorter than 15 minutes.

9. A modified flux for aluminum brazing comprising Li cations and a basic flux suitable for aluminum brazing with the proviso that, if the basic flux is a potassium fluoroaluminate flux, the content of $K_3AlF_6$ in said modified flux is equal to or lower than 5% by weight.

10. The modified flux of claim 9 wherein the basic flux is selected from the group consisting of $KAlF_4$, $K_2AlF_5$, $CsAlF_4$, $Cs_2AlF_5$, $Cs_3AlF_6$, $KZnF_3$, $K_2SiF_6$, their hydrates, and mixtures of two, three or more thereof.

11. The modified flux of claim 9 containing Li cations in the form of LiF or Li fluoroaluminate.

12. The modified flux of claim 11 containing Li cations in the form of $Li_3AlF_6$.

13. The modified flux of claim 9 wherein the content of $Li^+$ in said modified flux is equal to or greater than 0.1% by weight and equal to or less than 4.6% by weight when the total dry weight of the modified flux is set as 100% by weight.

14. The modified flux of claim 9 wherein the basic flux consists essentially of $KAlF_4$ and 10 to 40% by weight $K_2AlF_5$ or their hydrates, relative to the basic flux, and wherein the modified flux comprises from 5 to 36% by weight of $Li_3AlF_6$, with the balance to 100% by weight in the modified flux being the basic flux.

15. A flux composition containing a modified flux comprising Li cations and a basic flux suitable for aluminum brazing with the proviso that, if the basic flux is a potassium fluoroaluminate flux, the content of $K_3AlF_6$ in said modified flux is equal to or lower than 5% by weight, and one or more brazing and/or fluxing additives.

16. Aluminum parts for brazing, coated at least partially with a modified flux comprising Li cations and a basic flux suitable for aluminum brazing with the proviso that, if the basic flux is a potassium fluoroaluminate flux, the content of $K_3AlF_6$ in said modified flux is equal to or lower than 5% by weight.

17. A process for brazing of parts made from aluminum or aluminum alloys, comprising:
   coating at least partially the parts to be brazed with a modified flux comprising Li cations and a basic flux suitable for aluminum brazing with the proviso that, if the basic flux is a potassium fluoroaluminate flux, the content of $K_3AlF_6$ in said modified flux is equal to or lower than 5% by weight;
   assembling the parts;
   heating the parts to a temperature sufficiently high to braze the parts; and
   brazing the parts.

18. The process of claim 2 wherein the basic flux consists of at least one compound selected from the group consisting of $KAlF_4$, $K_2AlF_5$, $CsAlF_4$, $Cs_2AlF_5$, $Cs_3AlF_6$, $KZnF_3$, $K_2SiF_6$, and their hydrates.

19. The modified flux according to claim 9 wherein the basic flux is a potassium fluoroaluminate flux, and wherein the content of $K_3AlF_6$ in said modified flux is equal to or lower than 2% by weight.

20. The modified flux according to claim 9 wherein the basic flux is a potassium fluoroaluminate flux, and wherein the content of $K_3AlF_6$ in said modified flux is equal to or less than 1% by weight including 0% by weight.

21. Aluminum parts for brazing, coated at least partially with a flux composition containing a modified flux comprising Li cations and a basic flux suitable for aluminum brazing with the proviso that, if the basic flux is a potassium fluoroaluminate flux, the content of $K_3AlF_6$ in said modified flux is equal to or lower than 5% by weight and one or more brazing and/or fluxing additives.

* * * * *